Feb. 2, 1943.  F. NELL  2,309,862
THREAD CUTTING MECHANISM
Filed Sept. 30, 1941
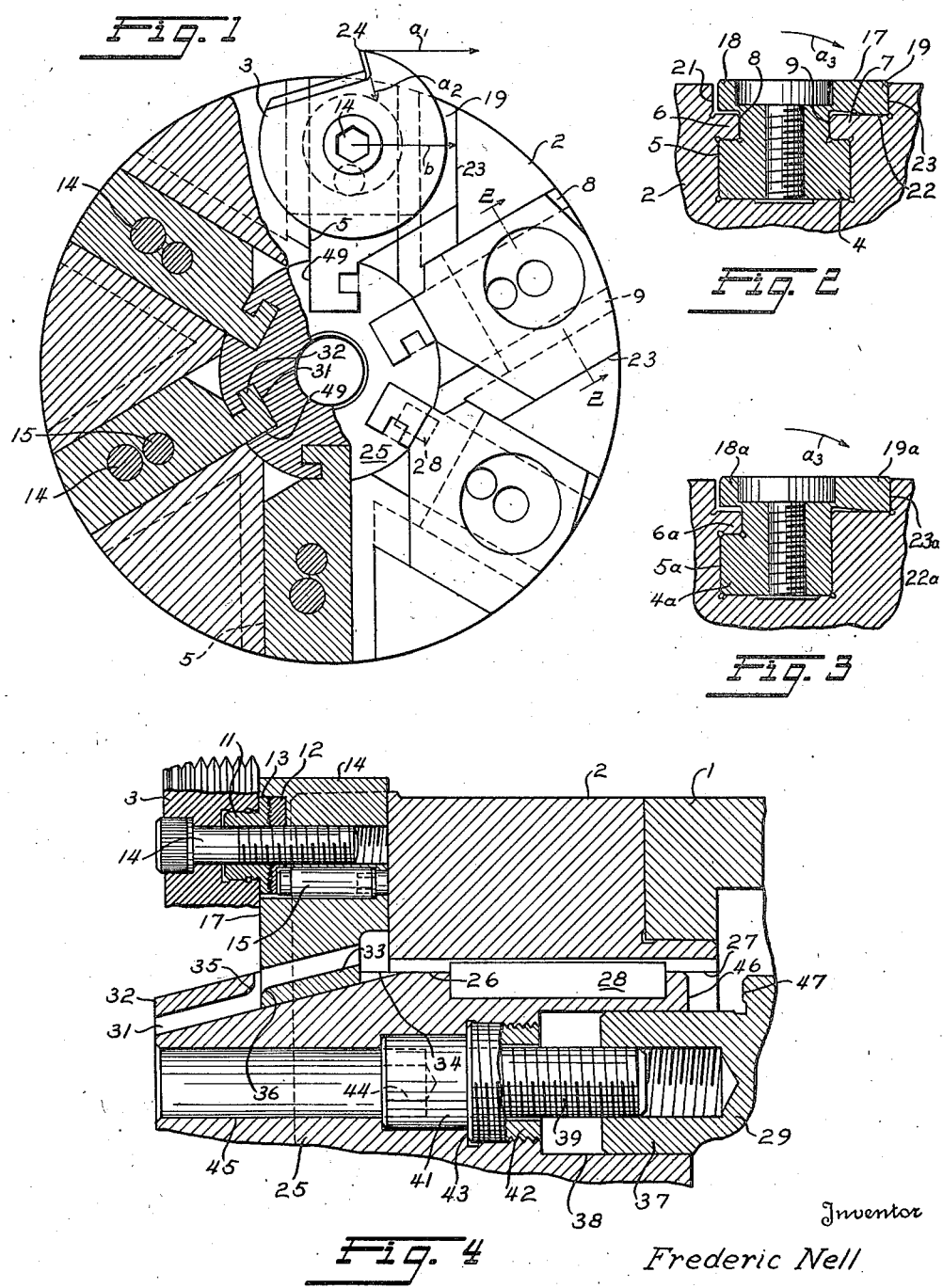
Inventor
Frederic Nell
By Strauch & Hoffman
Attorneys Patented Feb. 2, 1943

2,309,862

UNITED STATES PATENT OFFICE 2,309,862

THREAD CUTTING MECHANISM

Frederic Nell, Waynesboro, Pa., assignor to Landis Machine Company, Waynesboro, Pa., a corporation of Pennsylvania Application September 30, 1941, Serial No. 413,029

17 Claims. (Cl. 10—104)

The present invention relates to a thread cutting machine of the general type disclosed in the patent to Samuel F. Newman, No. 1,811,802, granted June 23, 1931, wherein the thread cutting elements are caused to have radial movement during thread cutting action, to produce a tapered thread, and in which the cutting elements are, at the end of the cutting movement, rapidly retracted from the work, thus permitting ready withdrawal of the mechanism away from the threaded object.

More specifically, this invention is concerned with the provision of a cam for controlling the radial position of the chaser assemblies which also cooperates in novel manner to give additional support to the latter against the cutting and associated stresses acting thereon; an improved mechanism for axially shifting the chaser controlling cam with respect to its actuating member; and novel means affording further support for the chaser assemblies comprising abutment surfaces on the face of the head, which are so positioned as to most efficiently resist the turning moments which tend to impair, and which previously have been especially detrimental to, the accuracy of threads cut in hard and tough materials.

For the purpose of illustration, the present improvements are shown embodied in a device for cutting internal threads, i. e., a tap. However, it should be clearly understood that the several novel features of this invention may be equally well embodied in thread cutting mechanisms designed to cut external threads and the terms "threading mechanism" or "thread cutting device," as here used, are intended to cover both types of machine. Also, throughout the present specification, the term "chaser" is used in its broad as well as in its limited sense: that is, it may mean the actual cutting element and its carrier or holder, or the term may refer to the cutting element alone, the meaning in each particular case from the context, being clear to those skilled in the art.

The present case is a continuation-in-part of my co-pending application Serial No. 173,711, filed November 9, 1937, for Thread cutting mechanism, now Patent No. 2,257,121, granted September 30, 1941, in which there is disclosed a device incorporating several of the improvements of the present invention. The present case includes the subject matter divided out of that application, and certain additional improvements over the threading machine shown in that application, as will hereinafter appear.

The primary object of this invention is to provide a novel and improved thread cutting machine in which a positive receding action is imparted to the chasers by mechanical means, and having means for rigidly and adequately supporting the thread cutting elements at all times, even when abnormally high stresses are developed incident to cutting hard and tough materials, and which greatly improves the quality of the threads cut, and which also embodies means for readily disengaging the chasers from the machine, without disturbing the diametrical setting of the chasers.

A further object is to provide an improved means for connecting the chaser controlling cam to an actuating element, providing a very rigid joint while at the same time permitting ready adjustment of the controlling cam with respect to the actuating element, for chaser removal and replacement.

A further important object is to provide a chaser controlling cam construction coacting with the head structure in novel manner so as to afford substantial additional support for the chasers and at the same time permitting the chasers to be readily removed from the head and replaced without disturbing the original setting of the device.

Another object is to provide a chaser assembly support with an integral abutment substantially normal to, and centrally of, the cutting stress tending to rotate the chaser assemblies about their axes.

Another object is to provide a chaser controlling cam having supporting surfaces located rearwardly of, but aligned with, the camming wings, in combination with a cam controlling mechanism operable to advance the cam forwardly to permit all the chasers to be simultaneously inserted in the head and accurately positioned by the supporting surfaces, and also operable to move the cam rearwardly to bring the chasers into thread cutting position.

A further object is to provide a thread cutting mechanism embodying a chaser supporting slide having abutting contact with both a head surface located perpendicular to the axis of the head, and with a second head surface located parallel to the head axis, the latter surface being substantially directly in line with the major resultant of the cutting stresses developed during operation, and the two surfaces cooperating to effectively resist any tendency of the slide to be displaced in response to the stresses incident to thread cutting.

A still further object is to provide a chaser slide and guideway assembly which accurately guides the chaser for sliding movement, adequately restrains the slide against any movements which would introduced inaccuracies in the thread, and yet which is extremely economical to manufacture.

Another object is to provide a tap with a pair of moment-resisting surfaces cooperating with the chaser assembly in such manner as to minimize any rotary displacement of the chaser about the axis of the chaser slide assembly during normal operation, one of the moment resisting surfaces being so located and disposed that a perpendicular thereto lies substantially parallel to the major component of the cutting stresses and closely adjacent the effective center of application of stresses to the chaser, so as to subject the chaser slide to substantially solely compressive forces.

Further objects will become apparent as the specification proceeds in conjunction with the annexed drawing, and from the appended claims.

In the drawing,

Figure 1 is a front elevational view of a threading mechanism embodying the invention, part of the structure being shown in section to simplify the disclosure;

Figure 2 is a sectional view of the chaser slide and guideway, taken substantially along the line 2—2 of Figure 1, looking in the direction of the arrows;

Figure 3 is a view similar to Figure 2, but illustrates a modified form of chaser slide and guideway, also forming part of the invention; and Figure 4 is a fragmental longitudinal sectional view of the mechanism shown in Figure 1, illustrating the controlling cam in chaser disengaging position.

With continued reference to the drawing, in which similar reference characters have been employed to denote similar parts throughout the several views thereof, the mechanism comprises a main body portion 1, having secured thereto a head member 2 by means of bolts and a key member (not shown) so as to prevent relative rotation between the head and the body. The main body portion is adapted to be carried by the machine on which the device is assembled and supports the thread cutting mechanism of the invention, that will now be described.

The thread cutting elements of the machine have been shown as circular chasers 3, which, as seen in Figure 1 are adapted to cut an internal thread in pipe or the like. The chasers are carried by holder blocks or slides 4, which are mounted for radial sliding movement in guideway 5 provided in the head. The guideways, as seen in Figure 2, are provided with longitudinally extending ribs 6 and 7 which fit into grooves 8 and 9, respectively, in the slide so as to prevent the latter from coming out of the guideways. The parts have close sliding fits, so that substantially no lost motion exists.

Chasers 3 may be secured to block 4 in any suitable manner but they are preferably splined to a bushing 11 having a serrated rear face meshing with a correspondingly serrated bushing 12. Bushings 11 and 12 are snugly piloted in an opening 13 in slide 4, and the parts are adapted to be rigidly clamped in assembled relationship by a screw 14 threaded into the slide and having a head recessed into the face of the chaser. Bushing 12 is provided with a peripheral notch which receives the eccentric head of an adjusting member 15, the latter being freely journalled in a bore in the block. By rotating member 15, minor angular adjustments of the chaser may be effected, and by loosening screw 14, larger or major adjustments may be carried out by advancing the chaser by one or more serrations. The chaser adjusting mechanism just described forms the subject matter of my co-pending application Serial No. 336,666, filed May 22, 1940, for "Chaser assembly" and since no claim is made hereto in the present case it will not be further described.

One of the major features of the present invention resides in so designing a chaser slide, and having it cooperate with moment-resisting formations on the head in such manner as to adequately resist any tendencies of the chaser slide to rotate about its axis in response to the cutting stresses, even when subjected to abnormally high stresses, as for instance when cutting hard or tough material. This novel feature of the invention will now be described.

Slide 4 is so dimensioned that its front face 17 lies substantially flush with the face of the head, and is provided with flanges 18 and 19, which over-lie ribs 6 and 7 as shown in Figure 2. Flanges 18 and 19 seat in a recess 21 in the face of the head, which is coextensive with guideway 5. Flange 18 functions to primarily back up the chaser and to give the slide mechanical strength, and therefore is so dimensioned as to be spaced at appreciable distance from rib 6 and also recess 21.

The cutting forces are absorbed in novel manner, by locating flange 19 to the side of the slide opposite to the application of the major cutting thrusts, and by making it comparatively wide and seating it accurately on moment-resisting surfaces 22 and 23 in recess 21. By using this novel combination of elements a materially improved moment-resisting action is achieved, and yet the construction is simple in design and of low cost.

Referring to Figures 1 and 2, it is apparent that the cutting forces exerted at the cutting edge 24 of chaser 3, and which may be resolved into the components $a_1$ and $a_2$, are transmitted to the block by means of screw 14 and bushings 11 and 12. The forces transmitted to the slide are in turn transmitted to the head primarily through flange 19, as follows. One component of the force is represented in Figure 1 by the arrow $b$, and acts normal to surface 23. It is apparent that by providing block 4 with an enlarged flange 19, and providing enlarged bearing face 23, the slide and chaser are effectively restrained against clockwise rocking movement (Figure 1) in response to the forces transmitted thereto during thread cutting by surface 23 at one side and by the wall of groove 5 at the other. Also the cam is provided with grooves which materially assist in restraining the slide against displacement as will hereinafter appear.

Also, since the chaser proper is offset from the face of the chaser block and from the face of the head, there is a definite torqueing force represented as $a_3$ in Figure 2 tending to rotate the slide 4 about its longitudinal axis. Here again, however, surface 23, acting almost directly in line with the applied forces and closely adjacent the effective center of application of stress, effectively resists the torque. In other words, a perpendicular passing through surface 23 is disposed substantially parallel to the major component of the forces, and lies closely adjacent the effective center of application thereof, with the result that the moment arm is of minimum length and the force $a_3$ subjects flange 19 to substantially solely compressional forces. Surface 22 also resists the torqueing forces but to a lesser degree, because the major component is directed against surface 23.

In Figure 3 of the drawing there is disclosed a modified form of the invention in which chaser slide 4a is slidable in a groove 5a having a single longitudinal rib 6a. By mounting a slide in a groove having a single rib, the manufacturing process is materially simplified, and yet the assembly is adequately able to resist the forces to which it is subjected because surfaces 22a and 23a operate to absorb the forces and relieve rib 6a of stress.

Flange 19a of the device shown in Figure 3 cooperates with head faces 22a and 23a to resist forces $a_3$ and $b$ in substantially the same manner as the construction shown in Figure 2. The tendency of the slide block to rotate about its longitudinal axis, and also the tendency of the entire chaser block assembly to be circumferentially displaced around the face of the head during thread cutting are adequately resisted, even under the abnormally high stresses incident to cutting hard and tough materials. In both instances the moment-resisting walls form a V-shaped groove, one wall of which takes the major thrusts and the other wall absorbing the minor components and other incidental forces to which the head is subjected.

The chaser slides are controlled by a novel assembly which also assists the slides in resisting the forces to which they are subjected in operation. Referring to Figure 4, the chaser slide blocks are controlled by a cam 25, provided with a cylindrical surface 26 fitting into a corresponding bore 27 in head 2. This cam is restrained against rotation with respect to the head by means of a key 28.

Aligned with each chaser assembly is a cam groove 31 having an over-lying rib or projection 32. The inner ends of the chaser slides are adapted to closely fit within grooves 31 and have cam wings 33 adapted to coact with projection 32 and positively pull the chaser slides inwardly when the cam 25 is moved to the right in Figure 4. When the cam is moved to the left (Figure 4) the chaser slides are forced outwardly by the bottoms of cam grooves 31.

As seen in Figure 4, the bottom of each cam groove 31 is aligned with a chaser supporting surface or ledge 34, so that when the parts are in the chaser loading position shown in Figure 4, the slides may all be inserted in the guides and forced inwardly as far as they will go into engagement with surface 34, so that when the cam is subsequently moved to the right it will cause projections 32 to simultaneously "pick up" all of the chaser slides, projections 32 and cam wings 33 being provided with curved surfaces 35 and 36, respectively, to further facilitate pick up of the parts. This is highly advantageous because if it were necessary to individually align each slide with its groove in the cam it would entail a time consuming and somewhat tedious operation.

During normal operation the cam undergoes a gradual motion to the right, so as to cause the chasers to recede and cut a tapered thread, and upon conclusion of the threading operation the chasers are rapidly retracted so as to allow prompt removal of the work from the machine. Since the chaser retracting and associated mechanisms form no part of the present invention they will not be further described, it being understood that reference may be had to the aforementioned co-pending application for a complete disclosure thereof.

The novel mechanism employed to effect relative movement between the cam actuating member 29 and cam 25 will now be described. Plunger 29 is provided with a reduced portion 37 which is slidably received in a bore 38 in cam 25, the parts being secured together by means of a threaded member 39. A head 41 on member 39 is rotatably mounted in cam member 25 and restrained against any appreciable axial movement by means of an abutment member 42, threaded into the cam and tightly abutting a shoulder 43 therein. Head 41 is provided with an internal wrench socket 44, communicating with a bore 45 in the cam through which a wrench may be inserted to rotate member 39.

By rotating member 39, cam 25 may be projected outwardly from plunger 29 to the position shown in Figure 4, to permit withdrawal of the chaser slides from the head. Upon replacement of the slides, member 39 may be rotated in the opposite direction to bring the rear face 46 of cam 25 into engagement with an abutment 47 on plunger 29. In this manner the parts may be restored to the exact positions which they assumed prior to chaser removal, thereby making it possible to remove and replace the chasers without in any way disturbing their diametrical setting. At the same time, the assembly possesses the distinct advantage of providing a rigid unitary assembly between cam 25 and plunger 29, abutting faces 46 and 47 maintaining the parts in rigid alignment under all conditions of operation.

The novel cam assembly of the invention also possesses the important advantage of forming in effect extensions of guide grooves 5. Referring to Figure 1 it is seen that the walls 49 of cam grooves 31 are in exact alignment with guideways 5 and, in effect, form continuations thereof by reason of the fact that cam member 25 is rigidly restrained against relative angular rotation with respect to head 2 by key 28. Thus, added support is provided for chaser slides 4 by the increased bearing surface, and the rigidity of mounting is greatly enhanced. This equalizes the strain set up in the chaser assemblies and thereby produces a better thread form.

From the foregoing detailed disclosure of the invention, it is apparent that I have provided a threading machine having a novel chaser slide assembly embodying moment-resisting surfaces 22 and 23 which jointly coact and make it possible for the chaser assemblies to better withstand the stresses set up therein during operation, even when abnormally high stresses are developed incident to cutting threads in hard and tough materials, moment-resisting surface 23 being so located and disposed that a perpendicular therethrough lies substantially parallel to the major resultant of the cutting stresses and closely adjacent the effective point of application of stresses to the chaser; and that the machine also embodies novel means for advancing the cam with respect to the plunger and which enables the chaser assemblies to be removed and replaced without disturbing the diametrical setting of the chasers and also possesses the additional advantage of being so formed as to afford additional support for the chaser slides during operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a thread-cutting machine; a body member including a head element; a plurality of guide slots on said head, chasers slidably mounted in said slots; a chaser controlling cam supported in said head and associated with said chasers; cam slots in said member; cam wings on said chasers coacting with said cam slots; and means for holding said cam against angular movement within said head and with walls of said cam slots aligned with walls of said guide slots, and said cam wings having surfaces abutting said aligned walls, whereby said chasers are supported by both said head and said cam.

2. In a thread-cutting device, a plurality of chasers movably mounted on a support; means for controlling the relative position of said chasers with respect to the axis of said support; actuating means having a forwardly directed face normally in abutment with a rearwardly directed face on said controlling means; means for effecting relative displacement of said controlling and actuating means to separate said faces and further being adapted to secure the same in abutting contact.

3. In a thread-cutting device, a head; a plurality of chaser assemblies mounted for inward and outward movement on the front of said head and having cam wings at their inner ends; an axially movable cam assembly having cam grooves receiving said camming wings and fingers overlying said grooves and coacting with said camming wings, said cam assembly being adapted to reciprocate forwardly and rearwardly through a range sufficient to move said chaser assemblies outwardly or inwardly without losing contact with said camming wings, and additional outwardly directed surfaces on said cam assembly rearwardly of said cam fingers adapted to support said chaser assemblies with their camming wings in registry with said cam grooves when said cam assembly is moved forwardly beyond its normal range of movement.

4. The thread-cutting device defined in claim 3, wherein said cam assembly comprises a cam member; a plunger; and a threaded mechanism for selectively displacing said cam member forwardly into chaser releasing position, or for rigidly securing said cam member and plunger together in a single predetermined abutting relationship.

5. In a thread-cutting machine; a chaser controlling cam; an actuating element for said cam; cooperating abutment surfaces on said cam and said actuating element; a securing element having a head rotatably mounted in said cam and fixed against axial displacement with respect thereto, said securing element being threaded into said actuating element, whereby rotation of said securing element in one direction will draw said abutment surfaces into firm engagement, while rotation in the other direction will separate said surfaces and move said cam away from said actuating element.

6. In a thread-cutting device, a chaser; a chaser support; means for clamping said chaser to said support; means for resisting rotation of said support about an axis thereof; said last-mentioned means being integral with a member carrying said support and coacting with the latter in substantially direct alignment with the forces tending to effect such rotation of said support with respect to said member.

7. In a thread-cutting device, in combination, a chaser; a chaser support; means for clamping said chaser to said support; said chaser support having an integral wing extending substantially parallel to the base of said support and further having an uninterrupted surface connecting said wing with the base of said support.

8. The device defined in claim 7, together with a head member having a guideway slidably receiving said support; said guideway having a flat surface coextensive with, and slidably cooperating with the uninterrupted surface of said support.

9. In a thread-cutting device, a cutter support having a plurality of substantially radially extending guideways, and also providing a non-radial wall adjacent to but offset to one side of each guideway and lying in a plane disposed parallel to the axis of said cutter support; and a chaser assembly slidably mounted in each guideway and having a force transmitting portion projecting to said one side of each guideway and terminating in a face adapted to abut each of said non-radial walls.

10. The thread-cutting device defined in claim 9, wherein said cutter support is also provided with a wall contiguous to each of said non-radial walls, and disposed in planes normal to the axis of said cutter support and adapted to abut a second wall provided on each of the projecting portions of said chaser assembly.

11. In a thread-cutting device, a head having a plurality of substantially radial guideways provided therein; a cutter assembly mounted in each guideway and comprising a chaser and a chaser block rigidly secured together and disposed with the cutting edges of said chasers facing outwardly, for cutting internal threads, said blocks each having a portion projecting to the side opposite to the application of cutting stresses to the cutting edges of said chasers, and walls on said head abutting said projecting portions of said blocks and so disposed that a perpendicular thereto lies substantially parallel to the major component of the cutting stresses and closely adjacent the effective point of application of said stresses to said chasers.

12. The thread-cutting device defined in claim 11, together with a second set of walls on said head forming a dihedral angle with each of said first-named walls and cooperating with surfaces on said blocks to resist movement of said chaser assembly in response to other components of the stresses set up in said chaser assemblies.

13. In a threading device, a head having an outwardly extending guideway; a chaser supporting block slidably mounted in said guideway; a chaser secured to said block and adapted to transfer cutting stresses thereto in a predetermined direction during operation; and means for resisting any tendency of said block to undergo any appreciable tilt about its axis in response to said cutting stresses, comprising an integral flange on said block projecting transversely thereof in the direction of said stresses materially beyond said guideway and terminating in a substantially tangentially directed abutment face disposed substantially at right angles to the stresses applied to said block and substantially aligned with the effective center of application of cutting forces to said chasers; and a reaction face provided on said head and lying in full surface engagement with said abutment face.

14. The threading device defined in claim 13, wherein the flange of said block is also provided with an axially directed thrust face adjacent said abutment face and coacts with a second reaction face on said head.

15. The threading device defined in claim 13, wherein said head is recessed so as to locate said flange substantially flush with said head, and said reaction face comprises one of the walls of said recess.

16. In a thread cutting device, a support; a plurality of chaser assemblies on said support; guide means mounting said chasers for inward and outward sliding movement; cam means for positively moving said chasers inwardly and outwardly in said guide means; and means, including outwardly extending force transmitting faces associated with said cam and guide means, for causing cutting torques developing in said chasers during threading to be jointly absorbed by said guide means and said cam means.

17. In a thread cutting device, a head having a plurality of outwardly directed guideways therein; a chaser assembly slidably mounted in each of said guideways; and a longitudinally movable cam in said head having means for effecting inward and outward movement of said chasers in said guideways, said means also providing extensions of said guideways and coacting with faces on said chasers to resist cutting torques developing in the latter during threading.

FREDERIC NELL.